United States Patent
Espinosa et al.

(10) Patent No.: US 9,889,774 B2
(45) Date of Patent: Feb. 13, 2018

(54) RELEASE MECHANISM FOR SEAT RECLINER ASSEMBLY

(71) Applicant: FISHER & COMPANY, INCORPORATED, St. Clair Shores, MI (US)

(72) Inventors: Joe C. Espinosa, Shelby Township, MI (US); Christopher J. Ryan, Fraser, MI (US)

(73) Assignee: FISHER & COMPANY, INCORPORATED, St. Clair Shores, MI (US)

( * ) Notice: Subject to any disclaimer, the term of this patent is extended or adjusted under 35 U.S.C. 154(b) by 0 days.

(21) Appl. No.: 15/222,236

(22) Filed: Jul. 28, 2016

(65) Prior Publication Data
US 2017/0036570 A1 Feb. 9, 2017

Related U.S. Application Data

(60) Provisional application No. 62/202,317, filed on Aug. 7, 2015.

(51) Int. Cl.
*B60N 2/20* (2006.01)
*B60N 2/235* (2006.01)
*B60N 2/22* (2006.01)

(52) U.S. Cl.
CPC ............ *B60N 2/2227* (2013.01); *B60N 2/20* (2013.01); *B60N 2/2362* (2015.04)

(58) Field of Classification Search
CPC ....... B60N 2/2227; B60N 2/20; B60N 2/2362

USPC ......... 297/354.12, 366, 367 R, 367 P, 367 L, 297/378.12, 378.14
See application file for complete search history.

(56) References Cited

U.S. PATENT DOCUMENTS

| | | | | |
|---|---|---|---|---|
| 5,419,616 A | * | 5/1995 | Paetzold | B60N 2/20 297/378.12 X |
| 6,023,994 A | * | 2/2000 | Yoshida | B60N 2/2358 297/367 R |
| 6,068,341 A | * | 5/2000 | Rink | B60R 22/36 297/378.12 |
| 7,152,924 B1 | * | 12/2006 | Nemoto | B60N 2/20 297/378.12 |

(Continued)

*Primary Examiner* — Rodney B White
(74) *Attorney, Agent, or Firm* — Harness, Dickey & Pierce, P.L.C.

(57) ABSTRACT

A seat adjustment mechanism may include a recliner mechanism, a recliner handle, a hub and an unlock lever. The recliner mechanism is operable in an unlocked state permitting relative rotation between a seatback and a seat bottom and a locked state preventing relative rotation between the seatback and the seat bottom. The recliner handle is rotatable between locked and unlocked positions to move the recliner mechanism between the locked and unlocked states. The hub may transmit motion of the recliner handle to the recliner mechanism as the recliner handle moves between the unlocked and locked positions. The unlock lever may move the recliner mechanism between the locked and unlocked states. Rotation of the recliner handle may cause corresponding rotation of the hub and the unlock lever. However, the unlock lever may move the recliner mechanism into the unlocked state without causing corresponding rotation of the hub and the recliner handle.

27 Claims, 9 Drawing Sheets

(56) References Cited

U.S. PATENT DOCUMENTS

| | | | | |
|---|---|---|---|---|
| 7,172,253 B2* | 2/2007 | Haverkamp | ......... | B60N 2/3011 297/378.12 X |
| 7,293,838 B2* | 11/2007 | Sugama | ............... | B60N 2/0296 297/378.14 X |
| 7,419,217 B2* | 9/2008 | Ishizuka | ................ | B60N 2/236 297/367 R |
| 7,775,591 B2* | 8/2010 | Hahn | ...................... | B60N 2/12 297/378.12 X |
| 8,360,527 B2* | 1/2013 | Lehmann | ................ | B60N 2/20 297/367 R X |
| 9,227,532 B2* | 1/2016 | Balzar | ..................... | B60N 2/12 |
| 9,555,725 B2* | 1/2017 | Rothstein | ........... | B60N 2/01516 |
| 2006/0055223 A1* | 3/2006 | Thiel | ....................... | B60N 2/22 297/378.12 |
| 2010/0320823 A1* | 12/2010 | Thiel | ....................... | B60N 2/20 297/354.1 |
| 2011/0068612 A1* | 3/2011 | Thiel | ..................... | B60N 2/123 297/354.12 X |
| 2011/0127814 A1* | 6/2011 | Thiel | ..................... | B60N 2/123 297/216.1 |
| 2014/0138998 A1* | 5/2014 | Christoffel | .......... | B60N 2/2354 297/367 R |
| 2015/0015044 A1* | 1/2015 | Teufel | ................. | B60N 2/2356 297/366 |
| 2016/0339810 A1* | 11/2016 | Pluta | ..................... | B60N 2/065 |
| 2017/0088021 A1* | 3/2017 | Noguchi | ............. | B60N 2/2227 |
| 2017/0136921 A1* | 5/2017 | Dill | ......................... | B60N 2/12 |

\* cited by examiner

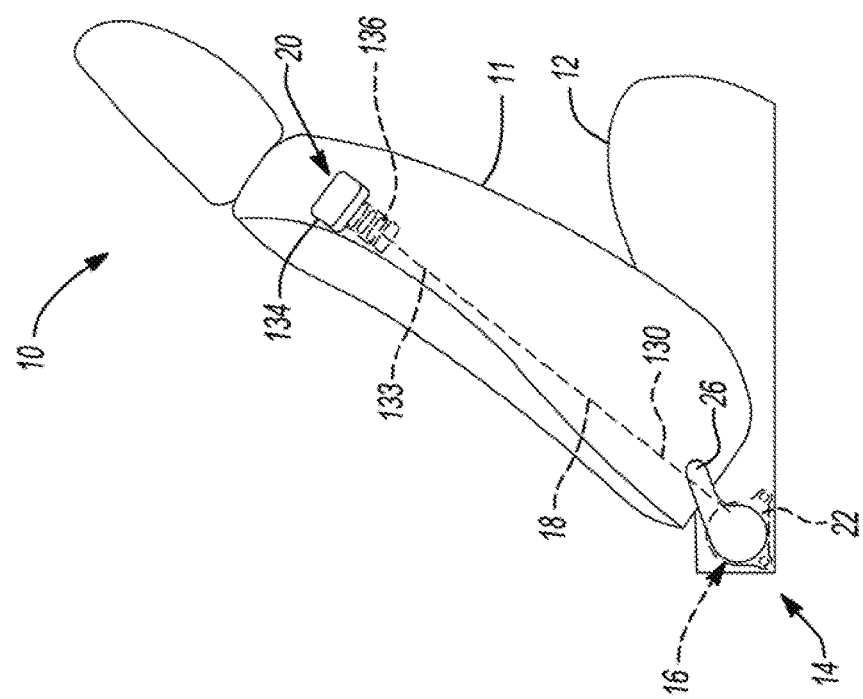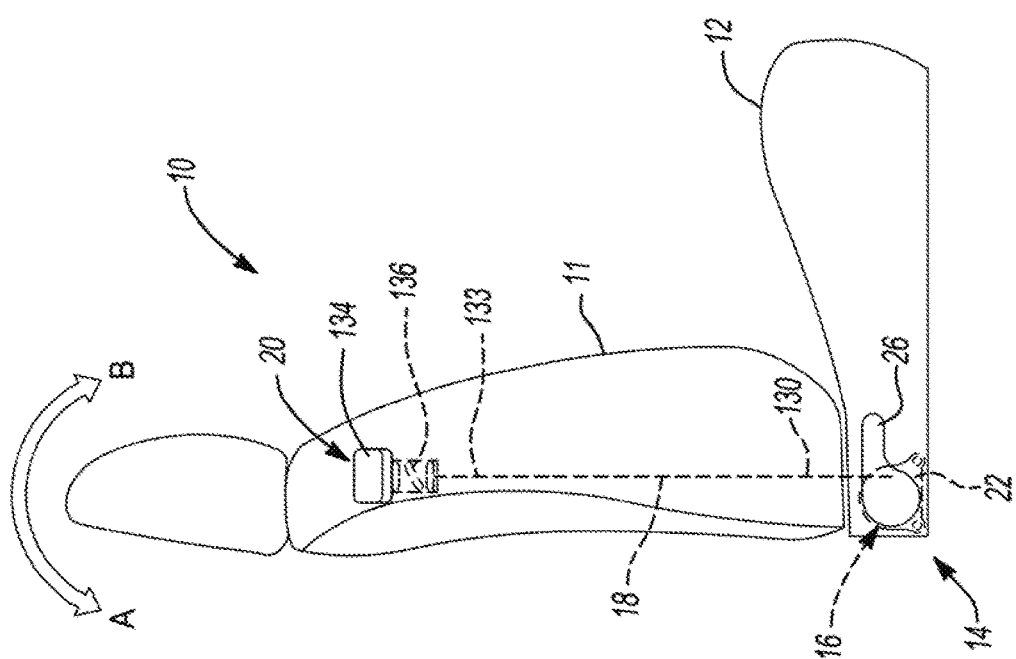

RELEASE MECHANISM FOR SEAT RECLINER ASSEMBLY

CROSS-REFERENCE TO RELATED APPLICATIONS

This application claims the benefit of U.S. Provisional Application No. 62/202,317, filed on Aug. 7, 2015. The disclosure of the above application is incorporated herein by reference.

FIELD

The present disclosure relates to a release mechanism for a seat recliner assembly.

BACKGROUND

This section provides background information related to the present disclosure and is not necessarily prior art.

Vehicle seats often include a recliner mechanism that can rotate a seatback relative to a seat bottom. Such vehicle seats can also include a release mechanism (or dump mechanism) to enable the seatback to be quickly moved from a relatively upright position to a forward dump position (e.g., to enable a passenger to ingress into and egress out of a space behind the seat such as a rear seating row). A release lever (or actuation lever) can be mounted on an upper, outboard portion of the seatback and can be connected to the release mechanism by a cable and/or link. The release lever can be manually moved by a user to actuate the release mechanism. Actuation of the release lever may also cause movement of a manual recliner handle (i.e., the handle that a user can actuate to adjust a position of the seatback between upright and reclined positions) and/or a spring attached to the manual recliner handle. Because the actuation of the release lever also moves the spring and/or manual recliner handle, a large amount of force may be necessary to actuate the release lever.

SUMMARY

This section provides a general summary of the disclosure, and is not a comprehensive disclosure of its full scope or all of its features.

In one form, the present disclosure provides an adjustment mechanism including an unlock lever configured to move a recliner mechanism into an unlocked position to allow a seatback to quickly move into a forward dump position (e.g., to allow access to a second-row or third-row seat in a vehicle). The system is configured such that the unlock lever can be actuated to move the recliner mechanism into an unlocked position without causing corresponding movement of a manual recliner handle and spring. In this manner, the force necessary to actuate the release lever is reduced.

In one form, the present disclosure provides a seat adjustment mechanism for permitting relative motion between a seatback and a seat bottom. The seat adjustment mechanism includes a first housing plate, a recliner mechanism, a recliner handle, a hub, and an unlock lever. The recliner mechanism is mounted to the first housing plate and operable in an unlocked state permitting relative rotation between the seatback and the seat bottom and a locked state preventing relative rotation between the seatback and the seat bottom. The recliner handle engages the recliner mechanism and is rotatable between a locked position in which the recliner mechanism is in the locked state and an unlocked position in which the recliner mechanism is in the unlocked state. The hub engages the recliner handle and the recliner mechanism and transmits motion of the recliner handle to the recliner mechanism to cause the recliner mechanism to move between the unlocked and locked states as the recliner handle moves between the unlocked and locked positions. The unlock lever engages the hub and the recliner mechanism such that rotation of the unlock lever moves the recliner mechanism between the locked and unlocked states. Rotation of the recliner handle causes corresponding rotation of the hub and the unlock lever. However, the unlock lever is configured to rotate to move the recliner mechanism into the unlocked state without causing corresponding rotation of the hub and the recliner handle.

In some configurations, a spring rotationally biases the recliner handle toward the locked position and the unlock lever is configured to rotate to move the recliner mechanism into the unlocked state without causing corresponding movement of the spring.

In some configurations, the unlock lever includes a shaft portion extending through a first aperture in the recliner mechanism and at least partially through a second aperture in the hub and the unlock lever is rotatable relative to the first housing plate about a longitudinal axis of the shaft portion.

In some configurations, the unlock lever includes a lever portion extending radially outward from the shaft portion.

In some configurations, the shaft portion includes a radially extending first protrusion and the hub includes a second protrusion that contacts the first protrusion to transmit rotation of the hub to the unlock lever.

In some configurations, an actuation lever is mounted on the seatback and operably connected to the unlock lever such that movement of the actuation lever causes corresponding rotation of the unlock lever and movement of the recliner mechanism into the unlocked state.

In some configurations, the actuation lever is connected to the unlock lever by a cable.

In some configurations, a radially outer end of the lever portion engages the cable.

In some configurations, the actuation lever is mounted at or near an upper end of the seatback.

In some configurations, the recliner mechanism is a round recliner mechanism including a first plate and a second plate that is movable relative to the first plate when the recliner mechanism is in the unlocked state and is fixed relative to the first plate when the recliner mechanism is in the locked state, and one of the first and second plates is rotationally fixed relative to the seat bottom and the other of the first and second plates is rotationally fixed relative to the seatback.

In another from, the present disclosure provides a seat adjustment mechanism for a seat assembly having a seatback and a seat bottom. The seat adjustment mechanism includes a first housing plate, a recliner mechanism, a recliner handle, a hub, an unlock lever, and an actuation lever. The recliner mechanism is mounted to the first housing plate and operable in an unlocked state permitting relative rotation between the seatback and the seat bottom and a locked state preventing relative rotation between the seat back and the seat bottom. The recliner handle engages the recliner mechanism and rotatable between a locked position in which the recliner mechanism is in the locked state and an unlocked position in which the recliner mechanism is in the unlocked state. The hub engages the recliner handle and the recliner mechanism and transmits motion of the recliner handle to the recliner mechanism to cause the recliner mechanism to move between the unlocked and locked positions. The unlocked lever engages the hub and the recliner mechanism such that rotation of the unlock lever moves the recliner mechanism between the locked and unlocked states. The actuation lever is operatively connected to the unlock lever and movable between a secure position in which the recliner mechanism is in the locked state and a release position in which the recliner mechanism is in the unlocked state. The movement of the actuation lever from the secure position to the release position causes corresponding movement of the unlock lever, and the unlock lever moves the recliner mechanism between the locked and unlocked states without corresponding rotation of the hub and the recliner handle.

In some configurations, rotation of the recliner handle causes corresponding rotation of the hub and the unlock lever.

In some configurations, the unlock lever includes a shaft portion and a lever portion extending radially outward from the shaft portion, and the shaft portion includes a radially extending first protrusion.

In some configurations, the hub includes a recess formed therein, and the shaft portion of the unlock lever extends through a first aperture in the recliner mechanism and at least partially through a second aperture in the hub such that the first protrusion is received in the recess formed in the hub.

In some configurations, the hub includes a second protrusion.

In some configurations, a first spring biases the actuation lever toward the secure position.

In some configurations, the second protrusion of the hub contacts the first protrusion to transmit rotation of the hub to the unlock lever.

In some configurations, a second spring rotationally biases the recliner handle toward the locked position such that movement of the actuation lever from the secure position to the release position causes corresponding rotation of the unlock lever and movement of the recliner mechanism to the locked state without causing corresponding movement of the second spring.

In some configurations, movement of the actuation lever to the release position causes the first protrusion to move in the recess formed in the hub.

In some configurations, the actuation lever is connected to the unlock lever by a cable.

In some configurations, the actuation lever is mounted at or near an upper end of the seatback.

In some configurations, the recliner mechanism includes a first plate and a second plate that is movable relative to the first plate when the recliner mechanism is in the unlocked state and is fixed relative to the first plate when the recliner mechanism is in the locked state, and one of the first and second plates is rotationally fixed relative to the seat bottom and the other of the first and second plates is rotationally fixed relative to the seatback.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a side view of a vehicle seat assembly in an upright position according to the principles of the present disclosure;

FIG. 2 is a side view of the vehicle seat assembly of FIG. 1 with a seatback in a forward dump position;

Corresponding reference numerals indicate corresponding parts throughout the several views of the drawings.

DETAILED DESCRIPTION

Figure 3:
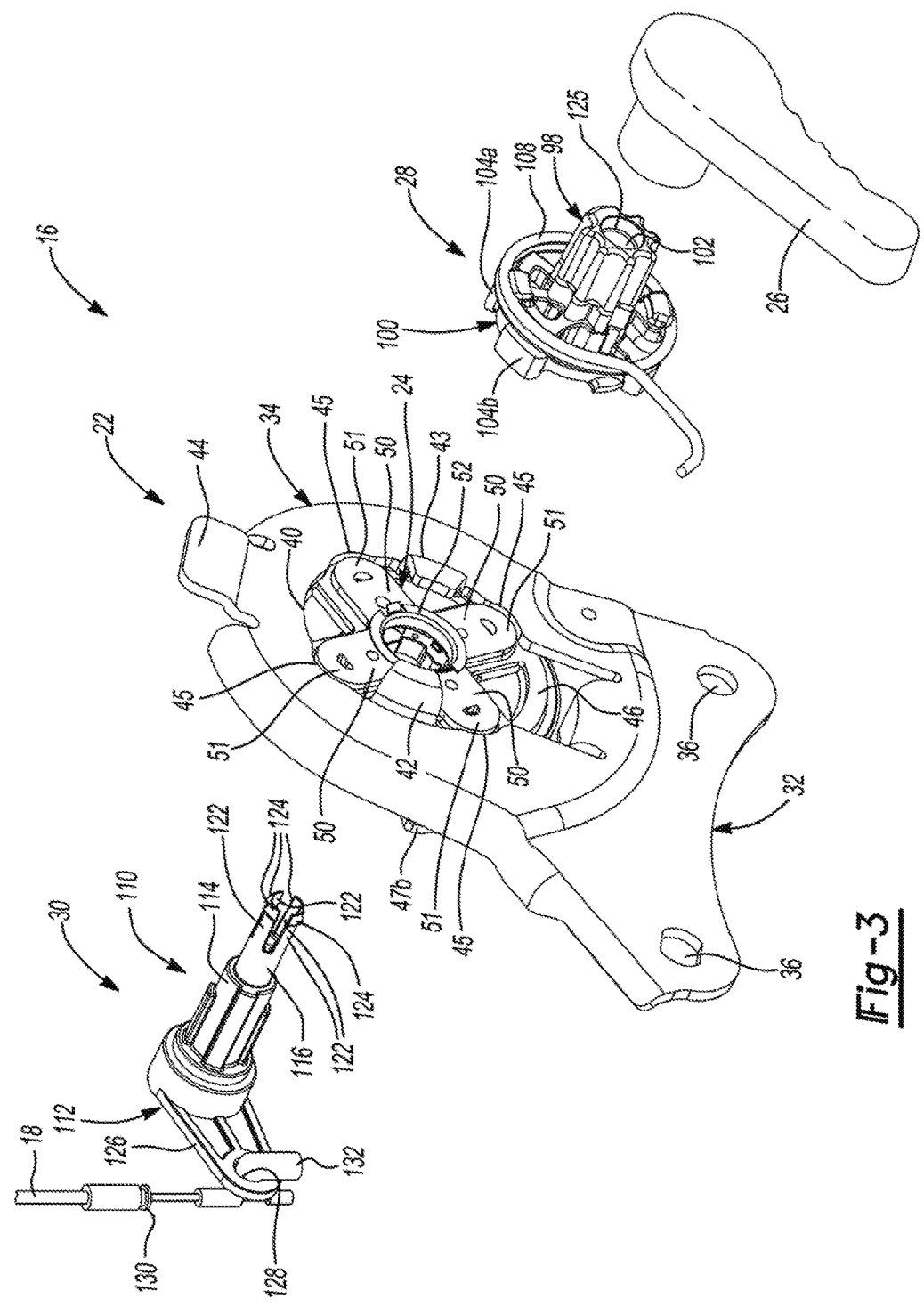
FIG. 3 is an exploded perspective view of a recliner assembly of the seat adjustment mechanism of FIG. 1.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1 and 2, a vehicle seat assembly 10 is shown. The vehicle seat assembly 10 may be positioned within a vehicle (not shown) and may include a seatback 11 attached to a seat bottom 12. A seat adjustment mechanism 14 may be operatively attached to the vehicle seat assembly 10 and may include a recliner assembly 16, a cable 18, and an actuation assembly 20. The recliner assembly 16 may be connected to the actuation assembly 20 via the cable 18 and/or one or more links (not shown). The recliner assembly 16 may also be attached to the seatback 11 and the seat bottom 12 of the vehicle seat assembly 10. The recliner assembly 16 may be operable in a locked state preventing relative rotation between the seatback 11 and the seat bottom 12 and an unlocked state permitting relative rotation between the seatback 11 and the seat bottom 12 among an upright position (FIG. 1), a rearward reclined position (not shown) and a forward dump position (FIG. 2).

Figure 4:
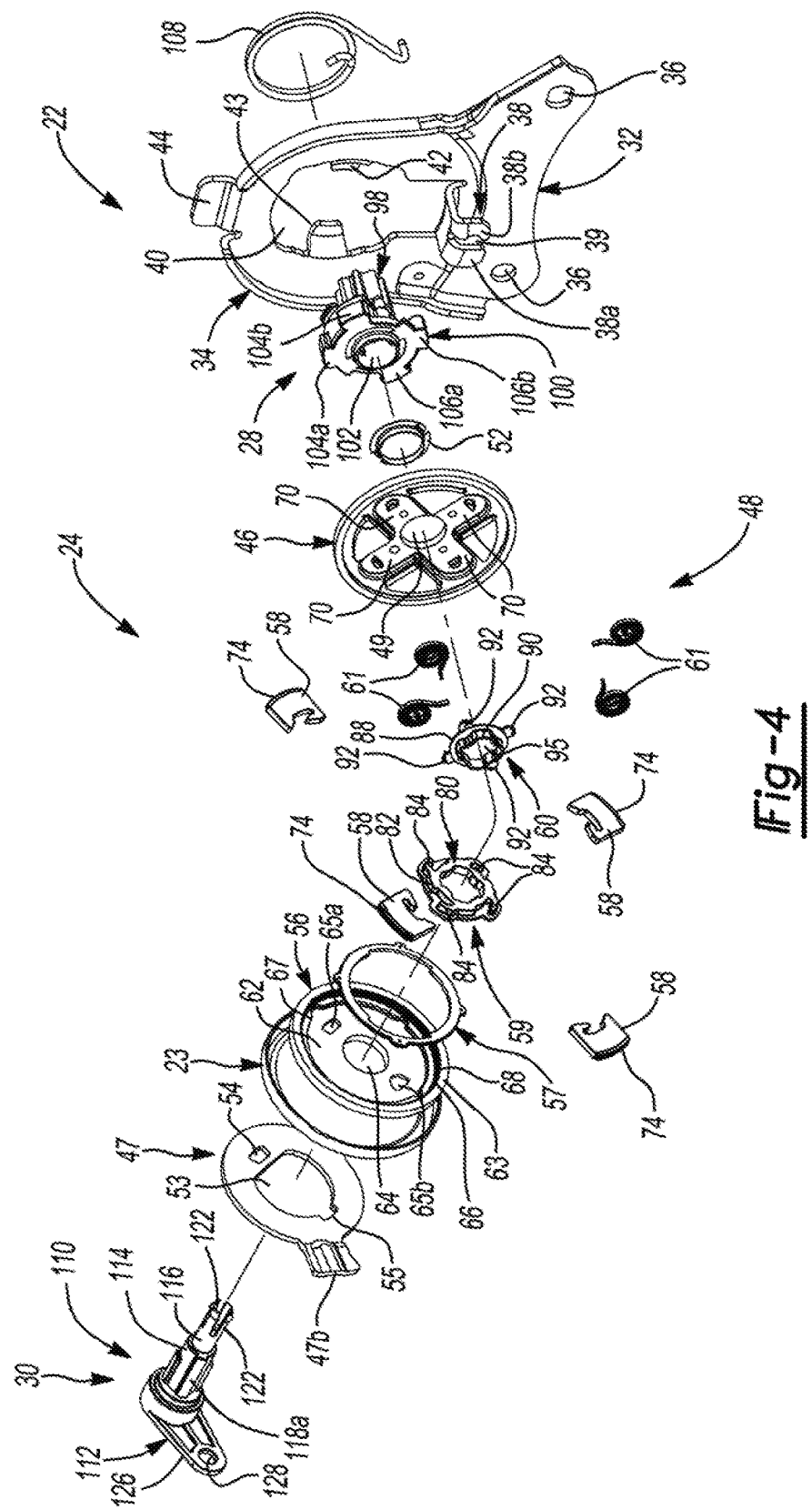
FIG. 4 is an exploded perspective view of a recliner mechanism of the recliner assembly of FIG. 3.

With reference to FIGS. 3-14, the recliner assembly 16 may include a housing plate 22, a recliner mechanism 24, a recliner handle 26, a hub 28 and an unlock lever 30. The housing plate 22 may be attached to the seat bottom 12 of the vehicle seat assembly 10. As shown in FIGS. 3 and 4, the housing plate 22 may include a first portion 32 and a second portion 34. The first portion 32 may include a plurality of apertures 36 and a tab 38. Fasteners (not shown) may extend through the plurality of apertures 36 to securely attach the housing plate 22 to the seat bottom 12. The tab 38 includes a first member 38a and a second member 38b that may limit or restrict the rotation of the seatback 11 in the rearward recline position and the forward dump position. The tab 38 may also define a slot 39 between the first member 38a and the second member 38b for mounting a spring (not shown) that provides a torque to return the seatback 11 from the rearward recline position (not shown) to the upright position (FIG. 1). The second portion 34 may be substantially circular and define an opening 40 in a central portion thereof. As shown in FIG. 3, the second portion 34 may include first and second flanges 42, 43, a tab 44, and a plurality of grooves 45. The first and second flanges 42, 43 may extend perpendicularly from a periphery of the opening 40 toward each other. The tab 44 may be positioned above the opening 40 and extend outwardly from a periphery of the second portion 34. The plurality of grooves 45 (FIG. 3) may be formed in the second portion 34 of the housing plate 22 at or near the periphery of the opening 40.

The recliner mechanism 24 may be mounted to the housing plate 22 and may be operable in an unlocked state (FIGS. 8 and 12) permitting relative rotation between the seatback 11 and the seat bottom 12 and a locked state (FIGS. 6 and 10) preventing relative rotation between the seatback 11 and the seat bottom 12. A cover ring 23 (FIGS. 6 and 8) may be attached (e.g., laser welding) to the recliner mechanism 24 to hold the recliner mechanism 24 together and also to cover the recliner mechanism 24 at a periphery, thereby preventing debris and fluid from damaging components. The recliner mechanism 24 may be a round recliner mechanism, for example, or any other suitable type of recliner mechanism. The recliner mechanism 24 may include a first plate 46, a second plate 47, and a locking assembly 48.

The first plate 46 may be rotationally fixed relative to the seat bottom 12 and include an aperture 49 and a plurality of mounting members 50 having mounting ends 51. As shown in FIG. 4, the aperture 49 may extend through a center portion of the first plate 46. A circular clip 52 may engage a periphery of the aperture 49 of the first plate 46 (FIG. 3). In some configurations, the clip 52 may be insert molded into the hub 28 to increase the hub 28 durability. As shown in FIG. 3, the plurality of mounting members 50 are formed on the first plate 46 such that each mounting end 51 is configured to be mounted into a corresponding groove 45 of the housing plate 22.

Figure 6:
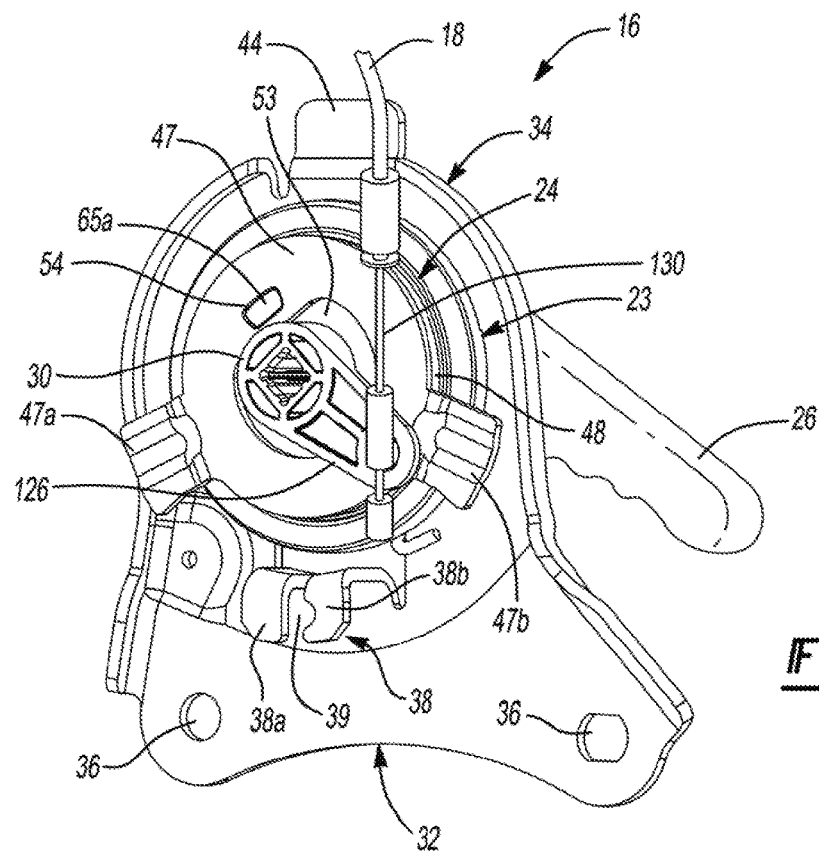
FIG. 6 is a perspective view of the recliner assembly with a recliner mechanism in a locked state.

The second plate 47 may be attached to and between the seat back frame (not shown) and the locking assembly 48 by laser welding, for example, such that the second plate 47 is operatively connected with the seatback 11 to permit movement thereof when the recliner mechanism 24 is in the unlocked state. The second plate 47 may also be coupled to the locking assembly 48 such that rotation of the locking assembly 48 causes corresponding rotation of the second plate 47. The second plate 47 may be rotatable relative to the first plate 46 when the recliner mechanism 24 is in the unlocked state and fixed relative to the first plate 46 when the recliner mechanism 24 is in the locked state. As shown in FIGS. 4 and 6, the second plate 47 may include an opening 53 extending through a center portion thereof, a substantially rectangular-shaped aperture 54 adjacent to the opening 53, and a pair of wings 47a, 47b protruding from a periphery of the second plate 47 (FIG. 6). The opening 53 may have a rectangular-shaped groove 55 formed at a periphery thereof. Wing 47a contacts the first member 38a of the tab 38 when the seatback 11 is in the rearward recline position to limit further rotation of the seatback 11 in the rearward recline position and the wing 47b contacts the second member 38b of the tab 38 when the seatback 11 is the forward dump position to further limit rotation of the seatback 11 in the forward dump position.

Figure 8:
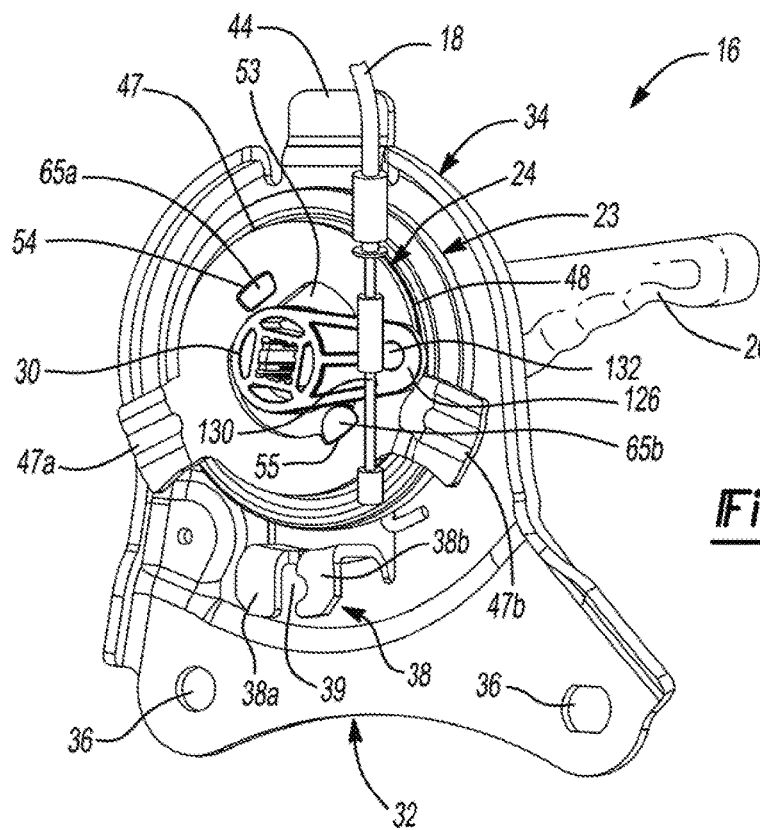
FIG. 8 is a perspective view of the recliner assembly with the recliner mechanism in an unlocked state and a recliner handle in an unlocked position.
Figure 12:
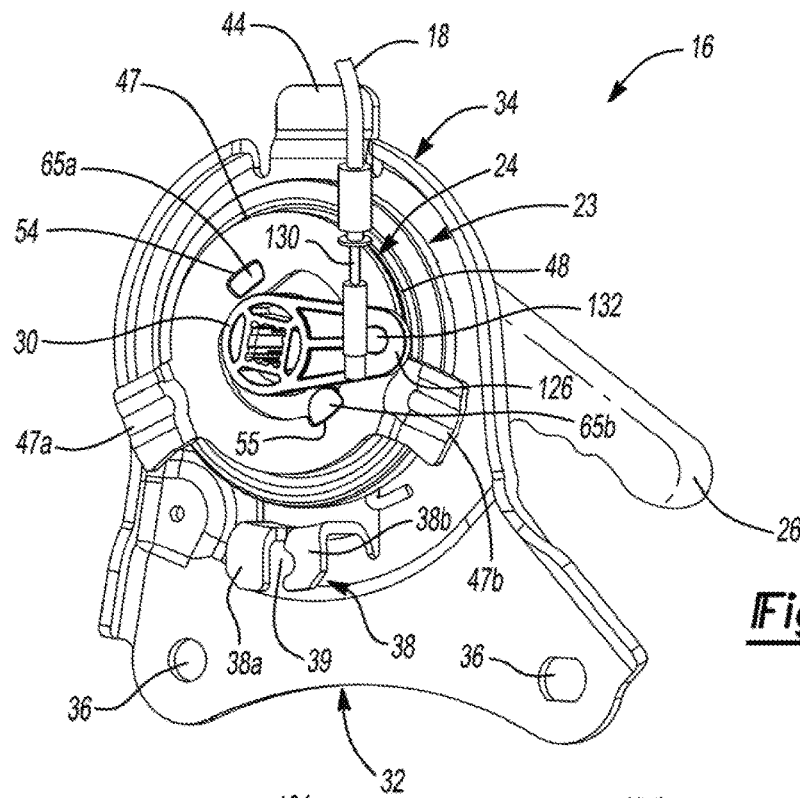
FIG. 12 is a perspective view of the recliner assembly with the recliner mechanism in the unlocked state and the recliner handle in the locked position.
Figure 13:
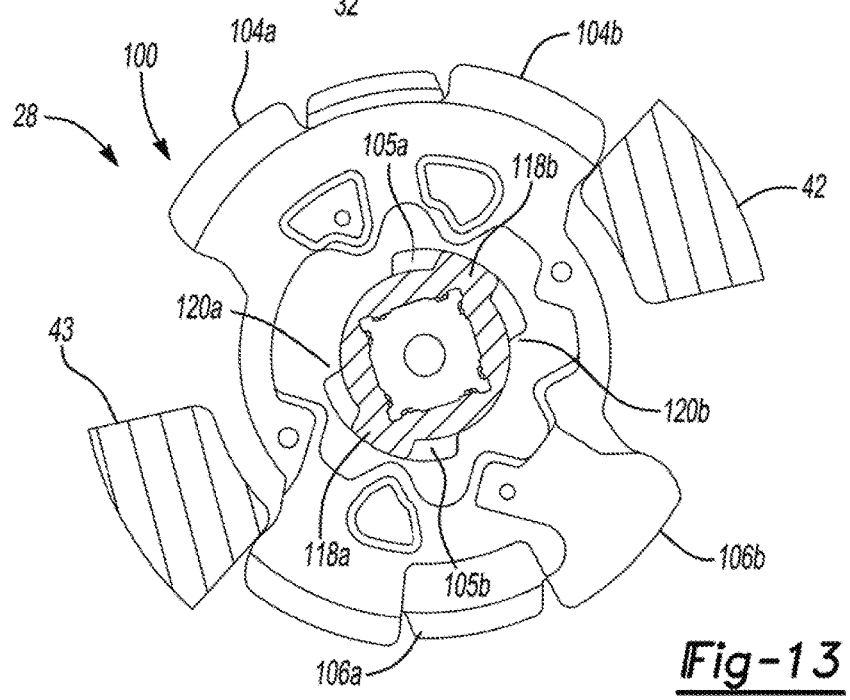
FIG. 13 is a cross-sectional view of the hub and unlock lever of the recliner assembly in the position of FIG. 12.

The locking assembly 48 may be attached to the second plate 47 and engaged with the unlock lever 30 such that rotation of the unlock lever 30 may move the locking assembly 48 between the locked and unlocked states. As shown in FIG. 4, the locking assembly 48 may include a circular locking plate 56, a control ring 57, a plurality of pawls 58, a cam 59, a connector disk 60, and a plurality of coil springs 61. The locking plate 56 may include a plate surface 62 and a rim 63 extending perpendicularly from a periphery of the plate surface 62. The plate surface 62 may include an aperture 64 extending through a center portion thereof and a pair of protrusions 65a, 65b extending from the plate surface 62 opposite the direction of the rim 63. As shown in FIGS. 8 and 12, the protrusion 65a is received in the aperture 54 of the second plate 47 and the protrusion 65b is received in the groove 55 of the second plate 47 once the locking assembly 48 is attached to the second plate 47.

Figure 5:
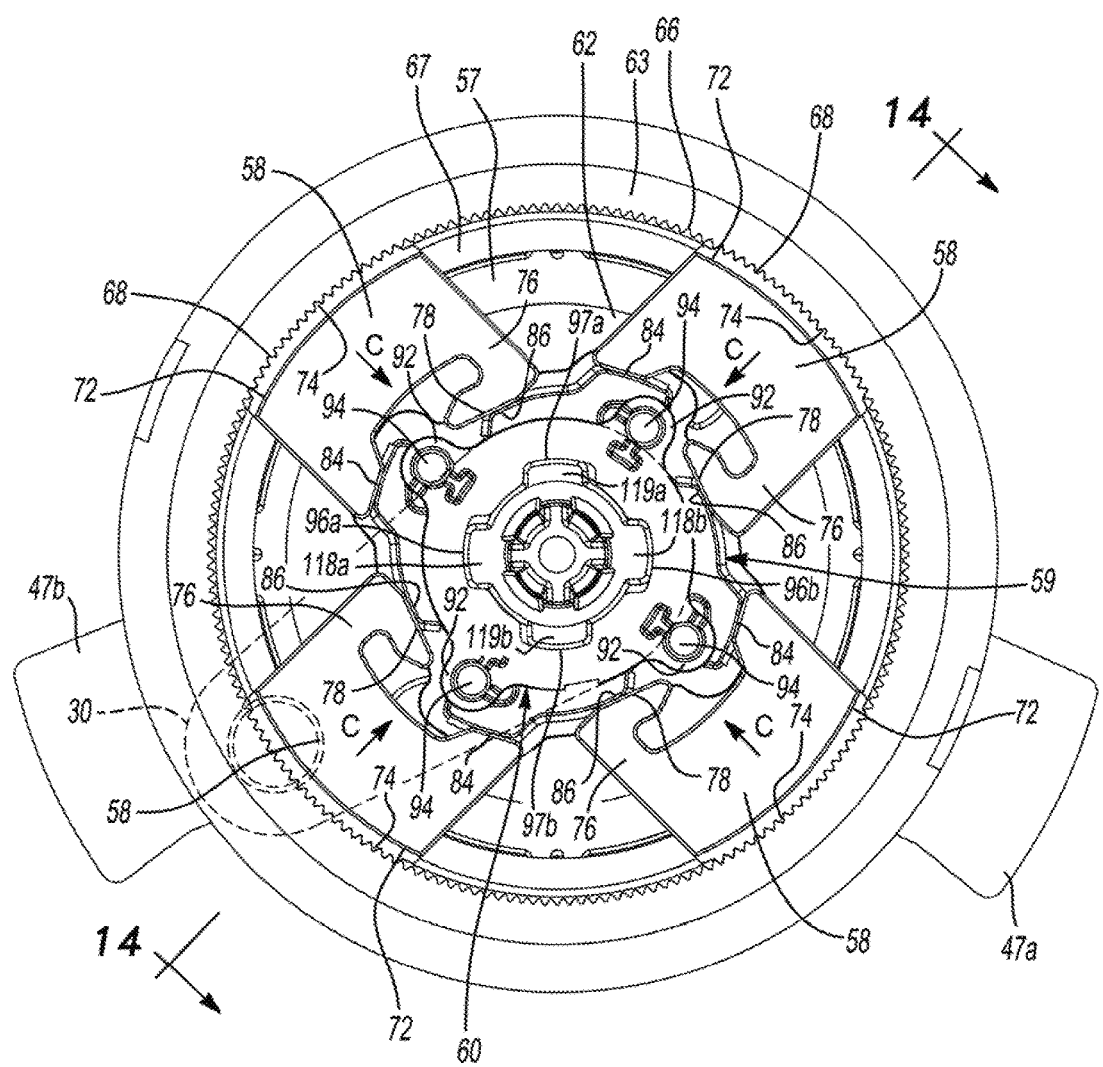
FIG. 5 is a partial perspective view of the recliner mechanism of FIG. 4 in a locked state.

As shown in FIGS. 4 and 5, the rim 63 may extend 360 degrees around the periphery of the plate surface 62 and include an inner surface 66 having a lobe 67 and teeth 68. The lobe 67 may extend 360 degrees around the inner surface 66 of the rim 63 and also project radially inwardly therefrom. The lobe 67 may also define a slot (not shown) that extends 360 degrees around a center portion thereof. The teeth 68 maybe adjacent to the lobe 67 and extend 360 degrees around the inner surface 66 of the rim 63. The control ring 57 may be received within the slot (not shown) of the lobe 67 and be configured to permit selective locking and unlocking of the recliner mechanism 24.

The plurality of pawls 58 may be radially disposed around the central aperture 49 of the first plate 46 with each pawl 58 slidably mounted in a corresponding recess 70 (FIG. 4) formed in the mounting member 50 of the first plate 46. As shown in FIG. 5, an edge 72 of each pawl 58 may include teeth 74 adapted for meshing engagement with the teeth 68 of the lock plate 56. The edge 72 may include a generally arcuate shape to improve engagement between the pawls 58 and the teeth 68 of the lock plate 56 when the recliner mechanism 24 is in the locked state. A portion 76 of each pawl 58 may include a latch 78.

The cam 59 may engage the connector disk 60. As shown in FIG. 4, the cam 59 may include a bushing portion 80 and a generally round disk portion 82. The bushing portion 80 may include a plurality of radial latches 84 and a plurality of cam lobes 86 (FIG. 5). The radial latches 84 may selectively engage the latches 78 of the pawls 58 to move the pawls 58 into the unlocked state.

The connector disk 60 is engaged with the cam 59 and the unlock lever 30. As shown in FIG. 4, the connector disk 60 may include a disk portion 88 and an extrusion 90 extending perpendicularly from the disk portion 88. The disk portion 88 may have a plurality of flanges 92 extending therefrom. Each flange 92 may include a circular projection 94 (FIG. 5) extending therefrom that is engaged to a corresponding coil spring 61 (FIG. 4). Because each projection 94 is engaged to the corresponding spring 61, the connector disk 60 rotationally biases the cam 59 in a manner that causes the cam lobes 86 to force the pawls 58 outwardly into the locked state (i.e., engaging the teeth 68 of the lock plate 56). The extrusion 90 may include an opening 95 (FIG. 4) having a pair of first grooves 96a, 96b (FIG. 5) and a pair of second grooves 97a, 97b (FIG. 5) at a periphery thereof.

The recliner handle 26 may engage the recliner mechanism 24 and may be rotatable between a locked position (FIG. 6) in which the recliner mechanism 24 is in the locked state and an unlocked position (FIG. 8) in which the recliner mechanism 24 is in the unlocked state. The recliner handle 26 may permit rotation of the seatback 11 in Direction A (FIG. 1) once the handle 26 is in the unlocked position and the recliner mechanism is in the unlocked state.

Figure 7:
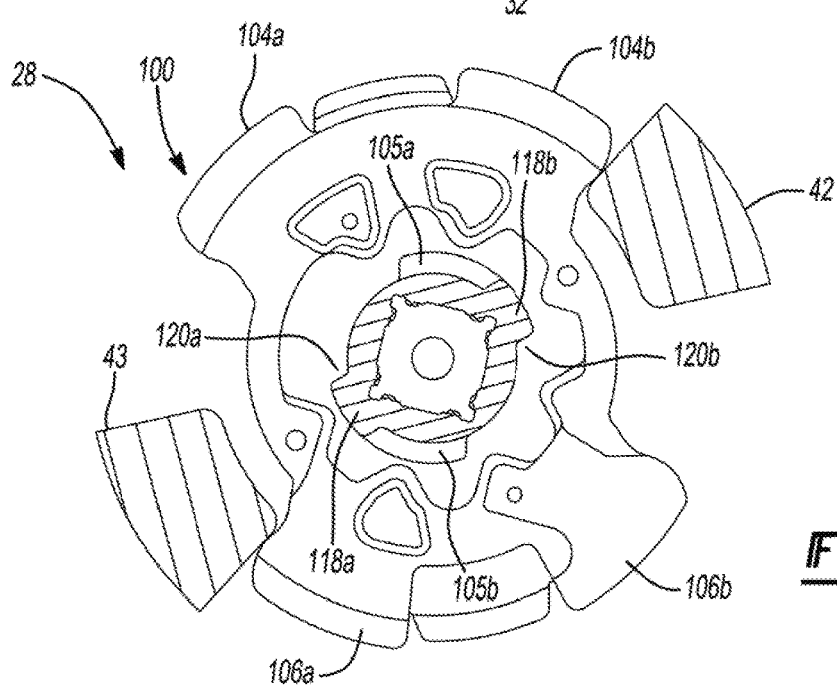
FIG. 7 is a cross-sectional view of a hub and unlock lever of the recliner assembly in the position of FIG. 6.
Figure 9:
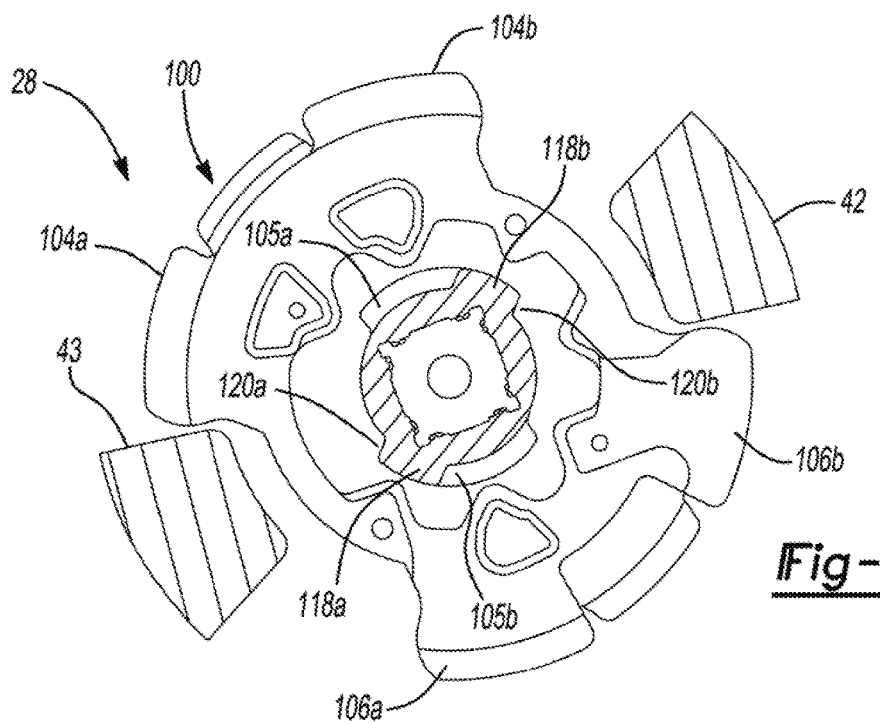
FIG. 9 is a cross-sectional view of the hub and unlock lever of the recliner assembly in the position of FIG. 8.
Figure 10:
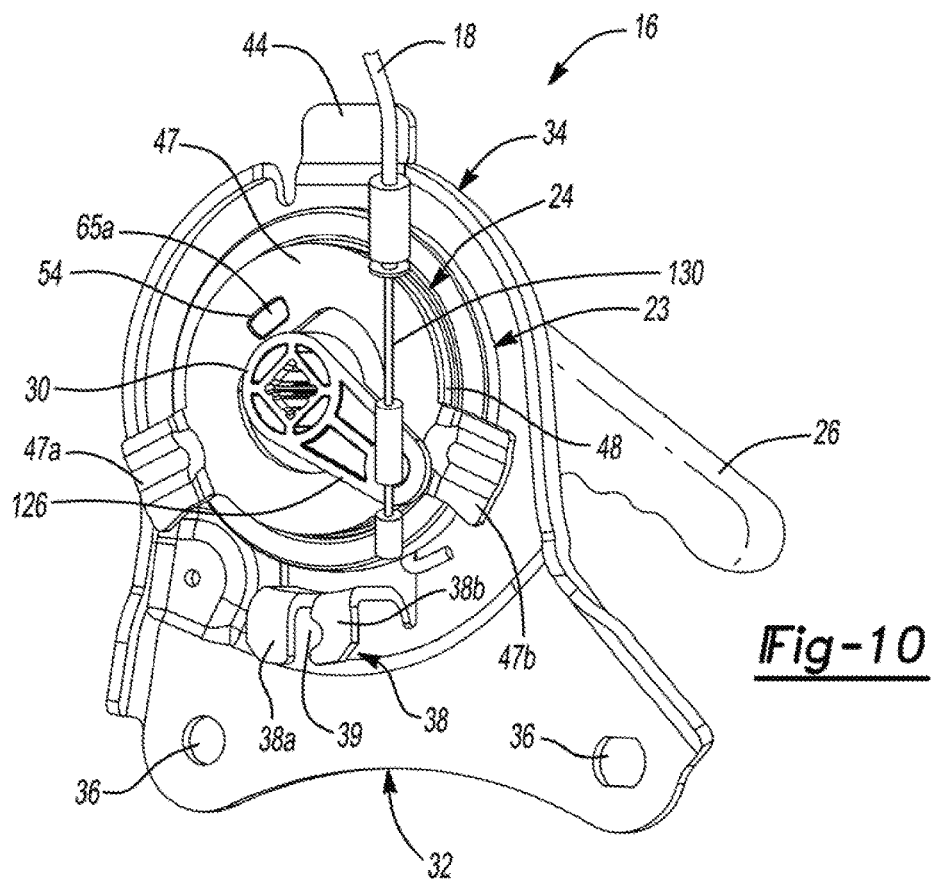
FIG. 10 is a perspective view of the recliner assembly with the recliner mechanism in the locked state and the recliner handle in the locked position.

The hub 28 may engage the recliner handle 26 and the recliner mechanism 24 and may transmit motion of the recliner handle 26 to the recliner mechanism 24 to cause the recliner mechanism 24 to move between the unlocked and locked states as the recliner handle 26 moves between the unlocked and locked positions. As shown in FIGS. 3 and 4, the hub 28 may include a shaft portion 98, a contact portion 100, and an aperture 102. The shaft portion 98 may engage the recliner handle 26. The contact portion 100 may be adjacent to the first plate 46 of the recliner mechanism 24. As shown in FIGS. 7 and 9, the contact portion 100 may include a first pair of tabs 104a, 104b, a second pair of tabs 106a, 106b, and a pair of recesses 105a, 105b. The first pair of tabs 104a, 104b may be positioned at an upper end of the opening 40 of the housing plate 22 and the second pair of tabs 106a, 106b may be positioned at a lower end of the opening 40 of the housing plate 22. The aperture 102 may extend through the shaft portion 98 and the contact portion 100.

Figure 11:
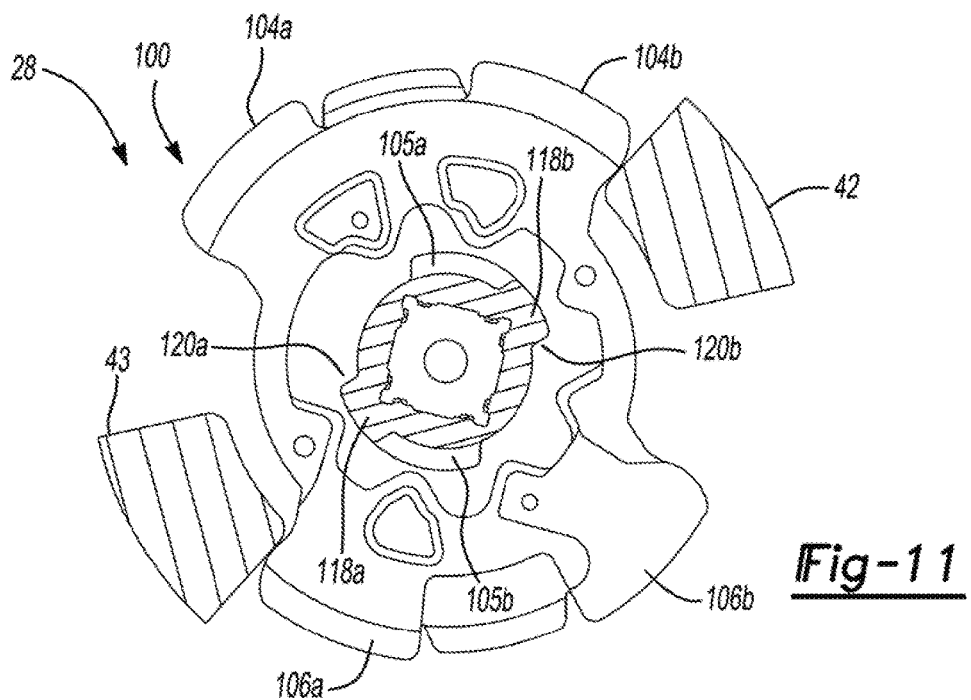
FIG. 11 is a cross-sectional view of the hub and unlock lever of the recliner assembly in the position of FIG. 10.

A torsion spring 108 may be attached to the hub 28 and rotationally bias the recliner handle 26 toward the locked position. Once the recliner handle 26 is biased toward the locked position, the tab 104b of the first pair of tabs 104a, 104b abuts the first flange 42 of the housing plate 22 (FIGS. 7 and 11) and the tab 106a of the second pair of tabs 106a, 106b abuts the second flange 43 of the housing plate 22 (FIGS. 7 and 11).

The unlock lever 30 may engage the hub 28 and the recliner mechanism 24. Rotation of the unlock lever 30 may move the recliner mechanism 24 between the locked and unlocked states. Rotation of the recliner handle 26 to move the recliner mechanism 24 between the locked and unlocked states may cause corresponding rotation of the hub 28 (FIG. 9), the unlock lever 30, and the spring 108 such that the tab 104a of the first pair of tabs 104a, 104b is adjacent to the second flange 43 (FIG. 9) and the tab 106b of the second pair of tabs 106a, 106b is adjacent to the first flange 42 (FIG. 9). However, the unlock lever 30 may be configured to rotate to move the recliner mechanism 24 between the locked and unlocked states without causing corresponding rotation of the hub 28 (FIG. 13), the recliner handle 26, and the spring 108.

The unlock lever 30 includes a shaft portion 110 and a lever portion 112. The shaft portion 110 may extend through the opening 53, the aperture 64, the opening 95, and the opening 49 of the second plate 47, the lock plate 56, the extrusion 90, and the first plate 46, respectively, and at least partially through the aperture 102 of the hub 28. In some configurations, a steel spline may be molded into the hub 28 so that the unlock lever 30 is attached thereto via a fastener (not shown). The unlock lever 30 may be rotatable relative to the housing plate 22 about a longitudinal axis of the shaft portion 110.

The shaft portion 110 may include a proximal section 114 and a distal section 116. The proximal section 114 may include a pair of radially extending first protrusions 118a, 118b and a pair of radially extending second protrusions 119a, 119b. As shown in FIG. 5, first protrusions 118a and 118b extend through first grooves 96a and 96b, respectively, while second protrusions 119a and 119b extend through second grooves 97a and 97b, respectively. In this way, the unlock lever 30 is engaged with the connector disk 60 of the locking assembly 48 such that rotation of the unlock lever 30 causes rotation of the connector disk 60 and the cam 59. As shown in FIGS. 7 and 9, first protrusions 118a and 118b may also be received in recesses 105b and 105a, respectively, as the shaft portion 110 extends at least partially through the aperture 102 in the hub 28. The hub 28 may include a pair of second protrusions 120a and 120b that may contact first protrusions 118a and 118b, respectively, to transmit rotation of the hub 28 to the unlock lever 30.

Figure 14:
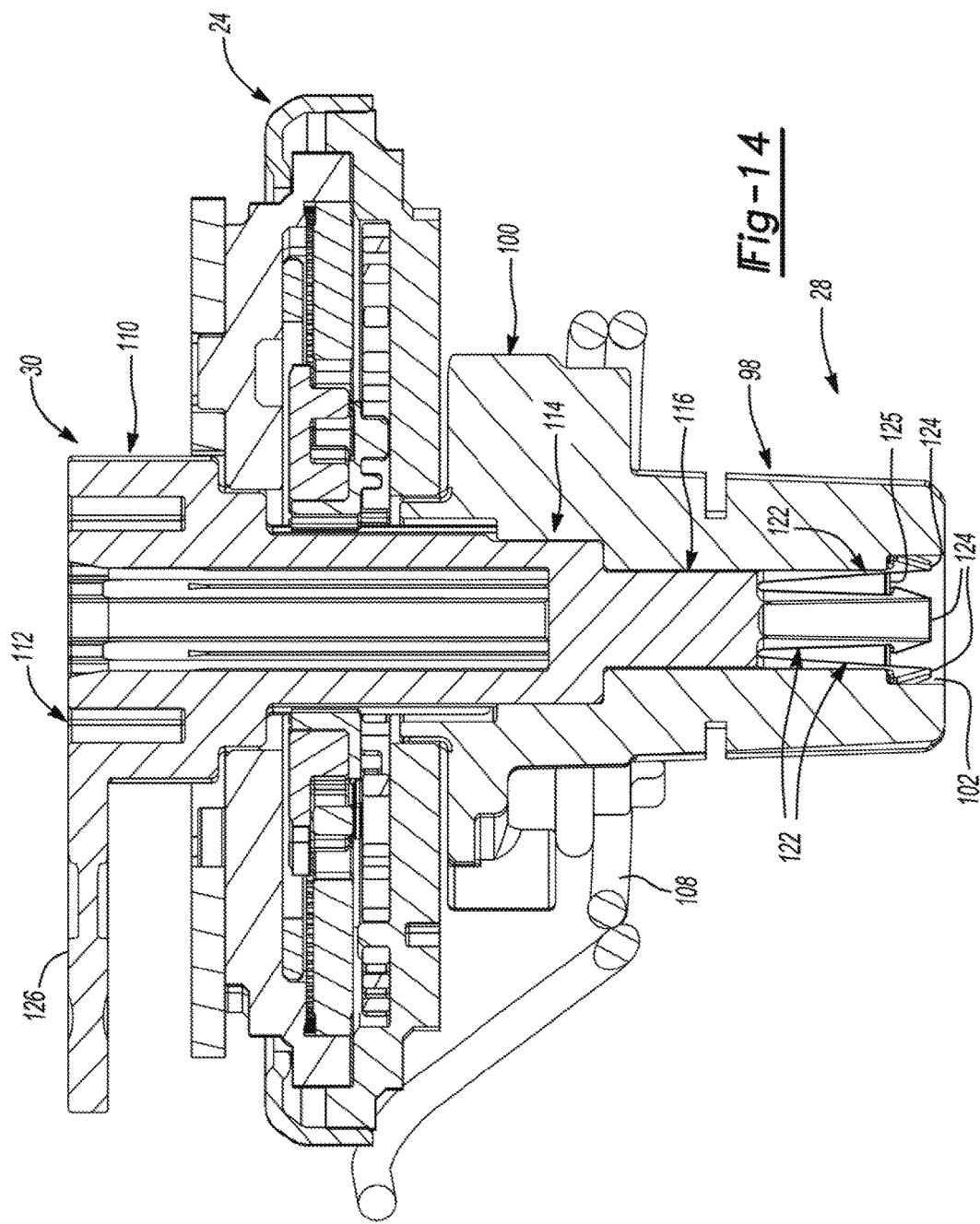
FIG. 14 is a cross-sectional view of the recliner mechanism taken along line 14-14 of FIG. 5.

As shown in FIG. 3, the distal section 116 of the shaft portion 110 may include a plurality of flexible spring elements 122 cantilevered therefrom. Each flexible spring element 122 may include a radially extending projection 124 that contacts a diametrical surface 125 extending into the aperture 102 of the hub 28 once the shaft portion 110 is fully inserted into the aperture 102 (FIG. 14). In this way, the unlock lever 30 is engaged to the hub 28 while still permitted to rotate about a longitudinal axis of the shaft portion 110. As shown in FIGS. 3 and 4, the lever portion 112 may extend radially outward from the proximal section 114 of the shaft portion 110 and include a radially outer end 126 having an aperture 128. A first end 130 of the cable 18 may include a perpendicularly extending engaging member 132 (FIG. 3) that is securely received in the aperture 128 of the outer end 126 causing the cable 18 and the unlock lever 30 to be engaged.

The actuation assembly 20 may be mounted on the seatback 11 (e.g., at or near an upper end of the seatback) and engage to a second end 133 of the cable 18 (FIGS. 1 and 2). In this way, the actuation assembly 20 may be operably connected to the unlock lever 30 such that movement of the actuation assembly 20 between a secure position and a release position causes corresponding rotation of the unlock lever 30 and movement of the recliner mechanism 24 between locked and unlocked states. The actuation assembly 20 may include an actuation lever 134 and a spring 136. The spring 136 may bias the actuation lever 134 toward the secure position.

With continued reference to FIGS. 1-14 operation of the seat adjustment mechanism 14 will be described in detail. When a passenger (not shown) ingress into or egress out of a space (e.g., a rear seating row) behind the vehicle seat assembly 10, the passenger may facilitate entry into or departure out of the space by moving the actuation lever 134 between the secure position and the release position to rotate the seatback 11 in Direction B (FIG. 2).

Movement of the actuation lever 134 from the secure position to the release position causes rotation of the unlock lever 30 connected thereto via the cable 18. Rotation of the unlock lever 30 rotates the cam 59 in a way that causes the latches 84 of the cam 59 to engage the latches 78 of the pawls 58 to move the pawls 58 in Direction C (FIG. 5). This causes the teeth 74 of the pawls 58 to disengage from the teeth 68 of the lock plate 56, thereby positioning the recliner mechanism 24 into the unlocked state (FIG. 12) without causing corresponding rotation of the hub 28 (FIG. 13), the recliner handle 26, and the spring 108. That is, the first protrusions 118b and 118a move in the recesses 105a and 105b, respectively, (FIG. 13) as the unlock lever 30 moves the recliner mechanism 24 from the locked state to the unlocked state, so that the rotating motion of the unlock lever 30 is not transferred to the hub 28. In this way, the passenger applies a reduced force to the actuation lever 134 of the actuation assembly 20 to move the recliner mechanism 24 from the locked state to the unlocked state, thereby permitting rotation of the seatback 11 in Direction B.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seat adjustment mechanism comprising:
   a housing plate;
   a recliner mechanism mounted to the housing plate and operable in an unlocked state permitting relative rotation between a seatback and a seat bottom and a locked state preventing relative rotation between the seatback and the seat bottom;
   a recliner handle engaging the recliner mechanism and rotatable between a locked position in which the recliner mechanism is in the locked state and an unlocked position in which the recliner mechanism is in the unlocked state;
   a hub engaging the recliner handle and the recliner mechanism and transmitting motion of the recliner handle to the recliner mechanism to cause the recliner mechanism to move between the unlocked and locked states as the recliner handle moves between the unlocked and locked positions; and
   an unlock lever engaging the hub and the recliner mechanism such that rotation of the unlock lever moves the recliner mechanism between the locked and unlocked states,
   wherein rotation of the recliner handle causes corresponding rotation of the hub and the unlock lever, and wherein the unlock lever is configured to rotate to move the recliner mechanism into the unlocked state without causing corresponding rotation of the hub and the recliner handle,
   wherein the unlock lever includes a shaft portion having a radially extending first protrusion that is movably received in a recess formed in the hub such that the first protrusion is movable within the recess when the unlock lever rotates relative to the hub.

2. The seat adjustment mechanism of claim 1, further comprising a spring rotationally biasing the recliner handle toward the locked position, wherein the unlock lever is configured to rotate to move the recliner mechanism into the unlocked state without causing corresponding movement of the spring.

3. The seat adjustment mechanism of claim 1, wherein the shaft portion of the unlock lever extends through a first aperture in the recliner mechanism and at least partially through a second aperture in the hub, and wherein the unlock lever is rotatable relative to the housing plate about a longitudinal axis of the shaft portion.

4. The seat adjustment mechanism of claim 3, wherein the unlock lever includes a lever portion extending radially outward from the shaft portion.

5. The seat adjustment mechanism of claim 4, wherein the hub includes a second protrusion that contacts the first protrusion to transmit rotation of the hub to the unlock lever.

6. The seat adjustment mechanism of claim 5, further comprising an actuation lever mounted on the seatback and operably connected to the unlock lever such that movement of the actuation lever causes corresponding rotation of the unlock lever and movement of the recliner mechanism into the unlocked state.

7. The seat adjustment mechanism of claim 6, wherein the actuation lever is connected to the unlock lever by a cable.

8. The seat adjustment mechanism of claim 7, wherein a radially outer end of the lever portion engages the cable.

9. The seat adjustment mechanism of claim 8, wherein the actuation lever is mounted at or near an upper end of the seatback.

10. The seat adjustment mechanism of claim 1, wherein the recliner mechanism is a round recliner mechanism including a first plate and a second plate that is movable relative to the first plate when the recliner mechanism is in the unlocked state and is fixed relative to the first plate when the recliner mechanism is in the locked state, and wherein one of the first and second plates is rotationally fixed relative to the seat bottom and the other of the first and second plates is rotationally fixed relative to the seatback.

11. A seat adjustment mechanism for a seat assembly having a seatback and a seat bottom, the seat adjustment mechanism comprising:
a housing plate;
a recliner mechanism mounted to the housing plate and operable in an unlocked state permitting relative rotation between the seatback and the seat bottom and a locked state preventing relative rotation between the seat back and the seat bottom;
a recliner handle engaging the recliner mechanism and rotatable between a locked position in which the recliner mechanism is in the locked state and an unlocked position in which the recliner mechanism is in the unlocked state;
a hub engaging the recliner handle and the recliner mechanism and transmitting motion of the recliner handle to the recliner mechanism to cause the recliner mechanism to move between the unlocked and locked positions;
an unlock lever engaging the hub and the recliner mechanism such that rotation of the unlock lever moves the recliner mechanism between the locked and unlocked states; and
an actuation lever operatively connected to the unlock lever and movable between a secure position in which the recliner mechanism is in the locked state and a release position in which the recliner mechanism is in the unlocked state,
wherein movement of the actuation lever from the secure position to the release position causes corresponding movement of the unlock lever, and wherein the unlock lever rotates to move the recliner mechanism between the locked and unlocked states without corresponding rotation of the hub and the recliner handle,
wherein the unlock lever includes a shaft portion having a radially extending first protrusion that is movably received in a recess formed in the hub such that the first protrusion is movable within the recess when the unlock lever rotates relative to the hub.

12. The seat adjustment mechanism of claim 11, wherein rotation of the recliner handle causes corresponding rotation of the hub and the unlock lever.

13. The seat adjustment mechanism of claim 11, wherein the unlock lever includes a lever portion extending radially outward from the shaft portion.

14. The seat adjustment mechanism of claim 13, wherein the shaft portion of the unlock lever extends through a first aperture in the recliner mechanism and at least partially through a second aperture in the hub.

15. The seat adjustment mechanism of claim 14, wherein the hub includes a second protrusion.

16. The seat adjustment mechanism of claim 15, further comprising a first spring biasing the actuation lever toward the secure position.

17. The seat adjustment mechanism of claim 16, wherein the second protrusion of the hub contacts the first protrusion to transmit rotation of the hub to the unlock lever.

18. The seat adjustment mechanism of claim 17, further comprising a second spring rotationally biasing the recliner handle toward the locked position such that movement of the actuation lever from the secure position to the release position causes corresponding rotation of the unlock lever and movement of the recliner mechanism to the unlocked state without causing corresponding movement of the second spring.

19. The seat adjustment mechanism of claim 18, wherein movement of the actuation lever to the release position causes the first protrusion to move in the recess formed in the hub.

20. The seat adjustment mechanism of claim 19, wherein the actuation lever is connected to the unlock lever by a cable.

21. The seat adjustment mechanism of claim 20, wherein the actuation lever is mounted at or near an upper end of the seat back.

22. The seat adjustment mechanism of claim 21, wherein the recliner mechanism includes a first plate and a second plate that is movable relative to the first plate when the recliner mechanism is in the unlocked state and is fixed relative to the first plate when the recliner mechanism is in the locked state, and wherein one of the first and second plates is rotationally fixed relative to the seat bottom and the other of the first and second plates is rotationally fixed relative to the seatback.

23. A seat adjustment mechanism for a seat assembly having a seatback and a seat bottom, the seat adjustment mechanism comprising:
a housing plate;
a recliner mechanism mounted to the housing plate and operable in an unlocked state permitting relative rotation between the seatback and the seat bottom and a locked state preventing relative rotation between the seat back and the seat bottom;
a recliner handle engaging the recliner mechanism and rotatable between a locked position in which the recliner mechanism is in the locked state and an unlocked position in which the recliner mechanism is in the unlocked state;
a hub engaging the recliner handle and the recliner mechanism and transmitting motion of the recliner handle to the recliner mechanism to cause the recliner mechanism to move between the unlocked and locked positions;
an unlock lever engaging the hub and the recliner mechanism such that rotation of the unlock lever moves the recliner mechanism between the locked and unlocked states;
an actuation lever operatively connected to the unlock lever and movable between a secure position in which the recliner mechanism is in the locked state and a release position in which the recliner mechanism is in the unlocked state;

a first spring biasing the actuation lever toward the secure position; and a second spring rotationally biasing the recliner handle toward the locked position such that movement of the actuation lever from the secure position to the release position causes corresponding rotation of the unlock lever and movement of the recliner mechanism to the unlocked state without causing corresponding movement of the second spring, wherein movement of the actuation lever from the secure position to the release position causes corresponding movement of the unlock lever, and wherein the unlock lever moves the recliner mechanism between the locked and unlocked states without corresponding rotation of the hub and the recliner handle, wherein the unlock lever includes a shaft portion and a lever portion extending radially outward from the shaft portion, and wherein the shaft portion includes a radially extending first protrusion, wherein the hub includes a recess formed therein, and wherein the shaft portion of the unlock lever extends through a first aperture in the recliner mechanism and at least partially through a second aperture in the hub such that the first protrusion is received in the recess formed in the hub, wherein the hub includes a second protrusion, and wherein the second protrusion of the hub contacts the first protrusion to transmit rotation of the hub to the unlock lever.

24. The seat adjustment mechanism of claim 23, wherein movement of the actuation lever to the release position causes the first protrusion to move in the recess formed in the hub.

25. The seat adjustment mechanism of claim 24, wherein the actuation lever is connected to the unlock lever by a cable.

26. The seat adjustment mechanism of claim 25, wherein the recliner mechanism includes a first plate and a second plate that is movable relative to the first plate when the recliner mechanism is in the unlocked state and is fixed relative to the first plate when the recliner mechanism is in the locked state, and wherein one of the first and second plates is rotationally fixed relative to the seat bottom and the other of the first and second plates is rotationally fixed relative to the seatback.

27. The seat adjustment mechanism of claim 25, wherein the actuation lever is mounted at or near an upper end of the seat back.

* * * * *